(12) United States Patent
Hanfland et al.

(10) Patent No.: US 9,033,611 B2
(45) Date of Patent: May 19, 2015

(54) ROAD PAVER WITH LAYER THICKNESS MEASURING DEVICE

(75) Inventors: Dennis Hanfland, Mannheim (DE); Ralf Weiser, Ladenburg (DE)

(73) Assignee: JOSEPH VOGELE AG, Ludwigshafen/Rhein (DE)

( * ) Notice: Subject to any disclaimer, the term of this patent is extended or adjusted under 35 U.S.C. 154(b) by 11 days.

(21) Appl. No.: 13/524,436

(22) Filed: Jun. 15, 2012

(65) Prior Publication Data

US 2012/0321386 A1 Dec. 20, 2012

(30) Foreign Application Priority Data

Jun. 15, 2011 (EP) ..................................... 11004889

(51) Int. Cl.
| | | |
|---|---|---|
| *E01C 23/01* | (2006.01) | |
| *G01B 21/06* | (2006.01) | |
| *G01B 21/08* | (2006.01) | |
| *G01B 21/18* | (2006.01) | |
| *E01C 19/48* | (2006.01) | |

(52) U.S. Cl.
CPC ................ *G01B 21/08* (2013.01); *G01B 21/18* (2013.01); *E01C 19/48* (2013.01)

(58) Field of Classification Search
USPC ......................................... 404/84.1, 102, 118
See application file for complete search history.

(56) References Cited

U.S. PATENT DOCUMENTS

| | | | |
|---|---|---|---|
| 4,571,695 A | | 2/1986 | Elton et al. |
| 5,044,820 A | * | 9/1991 | Prang ........................... 404/84.1 |
| 5,201,604 A | | 4/1993 | Ferguson et al. |
| 5,393,167 A | * | 2/1995 | Fujita et al. ................... 404/84.1 |
| 5,588,776 A | * | 12/1996 | Swisher et al. ................. 404/72 |
| 5,975,473 A | | 11/1999 | Haas et al. |
| 6,729,596 B2 | | 5/2004 | Gilabert |
| 7,044,680 B2 | * | 5/2006 | Godbersen et al. ............. 404/75 |
| 7,172,363 B2 | | 2/2007 | Olson et al. |
| 7,581,329 B2 | | 9/2009 | Basham |
| 8,070,385 B2 | * | 12/2011 | Green .......................... 404/84.5 |
| 8,696,237 B2 | * | 4/2014 | Hanfland et al. ............. 404/84.1 |
| 8,702,344 B2 | * | 4/2014 | Hanfland ...................... 404/84.1 |
| 2003/0000097 A1 | | 1/2003 | Docros |
| 2004/0056170 A1 | | 3/2004 | Fumado |
| 2005/0147467 A1 | | 7/2005 | Kieranen et al. |
| 2008/0263881 A1 | | 10/2008 | Basham |

(Continued)

FOREIGN PATENT DOCUMENTS

| | | |
|---|---|---|
| DE | 10025462 A1 | 12/2001 |
| DE | 10025474 A1 | 12/2001 |

(Continued)

OTHER PUBLICATIONS

U.S. Appl. No. 13/524,517, filed Jun. 15, 2012.

(Continued)

*Primary Examiner* — Gary Hartmann
(74) *Attorney, Agent, or Firm* — Fish & Richardson P.C.

(57) ABSTRACT

Road paver with a towing machine and a movable screed and with a measuring device that is provided for determining a layer thickness of a road pavement that has been newly laid by the screed. The measuring device is formed to determine the layer thickness at an intended location, seen relative to a direction of travel, behind a rear edge of the screed, whereby the measuring device is provided on the road paver such that the layer thickness can be determined independently of a geometric shape and/or a movement of the screed.

16 Claims, 2 Drawing Sheets

(56) References Cited

U.S. PATENT DOCUMENTS

| | | |
|---|---|---|
| 2010/0014916 A1 | 1/2010 | Green |
| 2012/0321384 A1* | 12/2012 | Hanfland et al. .............. 404/72 |
| 2012/0321385 A1* | 12/2012 | Hanfland .................... 404/84.1 |

FOREIGN PATENT DOCUMENTS

| | | |
|---|---|---|
| DE | 19851153 C1 | 9/2009 |
| EP | 0510215 A1 | 10/1992 |
| EP | 510215 B1 | 5/1997 |
| EP | 1403434 A1 | 3/2004 |
| EP | 1403434 B1 | 4/2008 |
| GB | 2448820 A | 10/2008 |
| JP | 01271504 A | 10/1989 |

OTHER PUBLICATIONS

U.S. Appl. No. 13/524,744, filed Jun. 15, 2012.

European Search Report mailed Dec. 2, 2011, which issued in corresponding EP Application No. 11004889.9.

European Search Report mailed Nov. 25, 2011, which issued corresponding EP Application No. 11004888.1.

European Search Report mailed Dec. 14, 2011, which issued in corresponding EP Application No. 11004887.3.

European Search Report mailed Nov. 25, 2011, which issued in corresponding EP Application No. 11004888.

European Search Report mailed Dec. 2, 2011, which issued in corresponding EP Application No. 11004889.

European Search Report mailed Dec. 14, 2011, which issued in corresponding EP Application No. 11004887.

Office Action which issued on Apr. 22, 2014 in corresponding Chinese Patent Application No. 201210202728.3, with English translation.

English translation of relevant portion of Opposition filed on Sep. 25, 2014 in corresponding European Patent Application No. 13/524,436.

\* cited by examiner

ROAD PAVER WITH LAYER THICKNESS MEASURING DEVICE

FIELD OF THE INVENTION

The present invention relates to a road paver with a towing machine and a movable screed and with a measuring device for determining the thickness of a layer of road pavement that has been newly laid by the screed. The measuring device is formed to determine the layer thickness at an intended location, seen relative to a direction of travel (V), behind a rear edge of the screed. Road pavers of this kind are used in practice in order to determine a layer thickness of the newly laid road pavement during a paving run.

BACKGROUND OF THE INVENTION

The laid road pavement is preferably a bituminous material, but can be sandy or stony layers or concrete. The determination of the layer thickness is therefore important in order to check the quality of the newly laid road pavement. If the calculated layer thickness of, for example, a bituminous layer, is too small, then there is a danger that the road pavement will break apart too early and leave behind potholes in this place. This results in expensive subsequent improvements to the road pavement. On the other hand, it is important to check the layer thickness with respect to whether or not it complies with an admissible maximum dimension, in order to avoid unnecessarily laying too much material, which would make the production more expensive.

In practice, ultrasound or radar systems, for example, are used in order to determine the layer thickness of a newly laid road pavement. Such systems are positioned at different places on the newly laid pavement in order to determine the layer thickness there. It is disadvantageous that the systems have to be relocated over and over, which necessitates additional operating personnel. Such a measurement furthermore only conditionally allows a meaningful result, because the layer thickness is determined on only a sampling basis in order to conclude from this the thickness of the other places. It is also disadvantageous that the limit areas of the superimposed layers, for example, the area between the plane and the newly laid road pavement or also the surface of the constructed road pavement, can be registered only with difficulty and imprecision. Therefore only an imprecise measurement result can be determined in most cases. As improvement measures, therefore, in practice reflective bodies are arranged on the surface or under the newly constructed road pavement, so that the newly laid layer can be more exactly localized. This, however, leads to additional costs for the provision of the reflective bodies and demands a great deal of time for the distribution of the same. Finally, the placement of the reflective bodies can also result in irreparable damage to the road pavement.

A further conventional method for determining the layer thickness would simply be to insert a measurement body into the newly laid road pavement layer, whereby the measurement body is inserted by feel down to the plane or the layer lying present underneath it. As a result of the insertion, however, holes remain in the layer, whereby water can possibly collect in these holes, which results in further damage.

As an alternative to this, it is possible to determine the layer thickness of the road pavement relative to an externally placed reference. The reference thereby acts, together with a device provided for this purpose that is mounted on the road paver or on the screed, as a transceiver unit. It is particularly possible to check the layer thickness with the transceiver in order to determine whether or not a minimum dimension or a maximum dimension has been exceeded. The use of an external reference has the technical disadvantage, however, that it must be relocated along the paving section during the paving run and, particularly in the case of difficult paving sections, such as ramps or inclinations, for example, that it is difficult to position.

DE 100 25 474 A1 describes a layer thickness determination by means of a relative position registration between a tractor and a tow arm of a road paver. The layer thickness is thereby determined using a height change in the screed relative to a height sensor. As an alternative to this, an inclination reference is used in order to determine the layer thickness at a rear edge of the screed. It is disadvantageous in this case that both the geometric shape and also the movement of the screed must be available in order to calculate the layer thickness. Imprecision in the measurement result only occurs, however, if the screed is dirty, or if there are vibrations during the paving run, because in this way particularly the screed assemblage is made to vibrate.

DE 100 25 462 A1 describes a method for determining a layer thickness with the use of an inclination sensor, which, together with a distance sensor, is mounted directly on a tow arm of the screed. The distance sensor and the inclination sensor present a reference for determining the layer thickness relative to a rear edge of the screed. Disadvantageous in this is that in the event of an exchange of the screed, all measuring devices for determining the layer thickness must be recalibrated.

EP 0 510 215 B1 describes a device for regulating a driving surface pavement thickness. The device comprises height sensors and inclination sensors, all of which are arranged on a screed assemblage in such a way that they register a change in the position of the screed. The device thereupon adjusts a compensatory movement for the screed in order to retain a stipulated layer thickness.

U.S. Pat. No. 7,172,363 B2 refers to a paving machine. A tow arm that bears a screed is movably mounted on the paving machine. The paving machine is surrounded by a frame that is mounted to the tow arm. A plurality of sensors that contribute to determining the layer thickness are arranged on the frame. Disadvantageous in this case is that due to a movement of the tow arm, the frame can be made to vibrate in such a way that the measurement result of the sensors becomes imprecise.

The known state of the art particularly comprises measuring devices for layer thickness determination that are mounted directly on the screed or directly on the tow arm that bears the screed. As an alternative to this, it is known to mount sensors for determining the layer thickness directly on the tow arm. In these known systems, the geometric shape of the screed and the movement of the screed during the paving run are to be taken into consideration as a reference for calculating the layer thickness. This, however, has the technical disadvantage that particularly when there is a screed exchange, it is necessary to recalibrate the measuring device. Sometimes it is even necessary to remove the complete measuring device because the measuring device is not designed in such a way as to be compatible with different screeds.

Based on the known state of the art, the object of the invention is therefore based on creating a road paver that allows an exact determination of the layer thickness during a paving run and that is suitable for flexible registration of the layer thickness.

The road paver according to the invention comprises a towing machine, a movable screed and a measuring device that is provided for determining a layer thickness of a road pavement newly laid by the screed. The measuring device of the road paver is formed to determine the layer thickness at an intended location behind, seen relative to a direction of travel, a rear edge of the screed. According to the invention, the measuring device is provided on the road paver in such a way that the layer thickness can be determined independently of a geometric shape of the screed and/or a movement of the screed.

In particular, this leads to more flexible use during the determination of the layer thickness, because the layer thickness can be calculated with the exclusion of all data of the screed. It is furthermore possible to do without cost-intensive means for registering a movement sequence of the screed.

With the invention, it is likewise possible to remedy the problem that imprecise measurement results arise if the screed is dirty. In addition to this, the road paver of the invention is configured in such a way that an exact layer thickness registration can be carried out by means of a reduced cost expenditure. Even the use of different screeds on the road paver does not affect the determination of the layer thickness. It is not necessary to calibrate the measuring device in order to adapt it to a screed exchange. Consequently, out in the "field", meaning on the paving section, it is possible to save time that normally is used for calibration work.

Finally, in the case of the invention, the measuring device cannot be disturbed by vibrations and angle changes in the screed assemblage, as a result of which there is a better measurement result.

The measuring device is preferably arranged on the towing machine of the road paver. Because of its weight, the towing machine can be made to vibrate only in very rare cases, whereby these vibrations are created, for example, by the compacting devices of the screed. This offers the technical advantage that vibrations or accelerations that act on the screed or on the bearing tow arm during the paving run are not transferred directly to the measuring device because, due to the inertial, weighty towing machine, they cannot be propagated. The measuring device consequently has a relatively quiet support location for its measurement. The measuring device is furthermore independent of an installation or removal of the screed and can remain mounted to the road paver, meaning to the towing machine, during such a time.

The measurement result can additionally be improved if the measuring device is mounted to the towing machine via a cushioning unit. Particularly during the unloading of the road paver from a lorry or loading of the road paver on to a lorry, impacts that are in some cases abrupt act on the paver, whereby these impacts can be absorbed by the cushioning unit.

In a further embodiment of the invention, the measuring device is mounted detachably to the towing machine. For this purpose, for example, a screw connection or a quick coupling system would be conceivable in order to loosen the measuring system swiftly and easily from the towing machine or to mount it on the same. This has as a result that the measuring device can be used flexibly, and offers the advantage that the measuring device can be removed from the road paver for possible maintenance purposes. A change of the measuring device to another road paver would also be possible in this way.

The measuring device can be mounted to the towing machine in an especially stable and robust way by means of a mounting element. The mounting element would preferably be formed as a stiff bar that can be attached, seen in the direction of travel, on a left and/or on a right side of the towing machine. It is also conceivable that the mounting element is put together from a plurality of bar-like elements in order to form in this way a closed frame that, as a part of the measuring device, surrounds the towing machine. Naturally there are no limits with regard to the stiffness and the alignment of the measuring means set for the design of the mounting element. The mounting element offers a stable and stiff base for the measuring device, and consequently this measuring device is not made to vibrate due to vibrations during the paving run. The mounting element furthermore offers the measuring device a certain manner of protection, because an operator can easily see the mounting element and therefore operates the measuring device with appropriate care. Finally, the mounting element ensures that the measuring device is aligned to or positioned on the towing machine advantageously.

The mounting element is preferably adjustable in its length relative to the direction of travel and/or in its width crosswise to the direction of travel. As a result of this adjustability in the length and/or width, it is possible to attach the mounting element, meaning the measuring device, to differently sized road paver types. Particularly the length adjustability of the mounting element also makes it possible for the layer thickness to be measureable at differently spaced places behind the screed. On the other hand, it is conceivable that particularly due to the width adjustability, a partial section of the mounting element, in addition to a substantial section of the mounting element that is provided for the actual layer thickness measurement, projects beyond a paved width already laid next to it so that the measuring device registers as a reference the layer thickness of the layer lying to the side and compares this to the freshly applied layer thickness. Extreme deviations in the pavement thickness could thereby lead to an acoustic or visual warning for the operator.

As an alternative to this, it would also be possible, in addition to the capability of adjusting the mounting element in its length and/or width, to form a support of the mounting element on the towing machine in such a way that the mounting element can be slid relatively in or crosswise to the direction of travel and can also be tipped relative to the towing machine of the road paver. It is consequently possible to position the measuring device differently and make it usable for different screeds. Finally, in this way the measuring device can be moved out of a risk zone, for example, if there is a pending screed change, in order to prevent collisions with the measuring device during the modification.

In order to determine the layer thickness exactly at the intended location behind the rear edge of the screed, the measuring device preferably comprises at least a first sensor that is directed at the intended location and configured to measure a distance from itself to the intended place, meaning to the surface of the newly laid road pavement. The at least one first sensor is preferably supported by the mounting element, whereby additional holders for supporting the at least one first sensor can be attached to the mounting element in order to space the sensor at a desired distance to the layer. It is thereby possible to form the mounting element in such a manner that it arranges not only the first sensor but rather also a plurality of sensors crosswise to the direction of travel behind the screed in such a manner that the sensors behind the screed take on a linear formation, for example, equidistant from one another, in order for each to measure a distance between itself and the newly laid road pavement. As an alternative to this, it can be expedient to arrange a plurality of sensors behind the screed so that they are offset from one another in the direction of travel in order to measure a distance to the deposited layer. This has the technical advantage that the sensors arranged behind the screed cover a certain area with their distance measurement in order to obtain a precise measure for the layer thickness.

It would also be conceivable that the layer thickness can be registered as an averaged value of a plurality of registered distance values of the sensors arranged behind the screed. In this way, erroneously registered layer thickness values that, for example, have been caused by defective sensor function, can be filtered out of the actual result of the layer thickness.

In a further advantageous embodiment of the invention, the measuring device comprises at least two additional sensors in order to measure a distance to the plane where no new road pavement has yet been laid. These sensors are arranged relative to the first sensor in the direction of travel in such a way that they are positioned in front of the screed. The sensors are preferably arranged on the mounting element equidistantly or are supported on the holders mounted to the mounting element and equidistant to one another, whereby the holders can be adjusted in such a way that the sensors are spaced at a certain distance to the plane. The adjustable holders make it possible to hold the sensors at different heights above the plane according to their specific characteristics, particularly with regard to their measuring sensitivity.

It is also advantageous if the sensors, whether for measuring the distance to the newly laid road pavement layer or for measuring the distance to the plane, are formed to carry out the respective distance measurement continuously. In this way, it is possible to avoid delays when determining the layer thickness, which leads to a faster measurement result. As an alternative to this, however, it is also possible to operate all sensors in such a way that these can then be activated in cycles when the road paver has driven a stipulated distance. The stipulated distance is preferably based on a distance between the at least two additional sensors.

The sensors for the distance measurement to the plane or to the surface of the newly laid road pavement are preferably acoustic and/or optic sensors, particularly ultrasound or laser sensors. In this way, contactless distance measurement is possible.

A measurement result of the layer thickness that is precise and also simple to calculate is achieved by spacing the at least two additional sensors at an integer multiple of the distance from the at least one first sensor, which is positioned behind the screed.

To calculate the layer thickness, the measuring device can also comprise at least one inclination sensor that registers the changes in the inclination of the measuring device during the paving run. The inclination sensor can be arranged at any place on the mounting element, whereby it is preferably mounted in the immediate vicinity of a place provided for supporting the measuring device so that the vertical accelerations on the measuring device caused by oscillations that arise are lower. In this way, it is possible to detect uneven places in the subgrade in such a way that these are taken into account in the measurement result of the layer thickness.

In order to register a movement of the towing machine in the direction of travel in a reliable manner, the measuring device comprises a path measurement unit. A path covered by the towing machine during the paving run can be determined precisely with the path measurement unit. It is also conceivable to register the driven path via the undercarriage of the towing machine.

To determine the layer thickness, an evaluation unit that is connected to all distance sensors that are provided for the layer thickness measurement, the at least one inclination sensor and the path measurement unit is preferably provided for the measuring device in order to determine the layer thickness at the intended place behind the screed. The individual measurement results of the sensors can thereby be transmitted to the evaluation unit by means of a cable connection or in a cable-free manner. While transmission of the measurement result by means of cabling the individual sensors to the evaluation unit would not be influenced by weather, a cable-free connection would allow the weight to be reduced. The measuring device, particularly the evaluation unit, would preferably be connected to an operating unit, which presents the layer thickness to the operator by means of optical or acoustical means. The presentation could, for example, take place by means of exact numerical values or by means of a "traffic light" display, in order to show the operator that a stipulated layer level has been reached in a way differentiated by colour. It would also be conceivable for the evaluation unit to be formed to inform the operating unit when the layer thickness reaches an authorized extreme value, meaning a minimum or maximum value of the layer thickness. This could be conveyed to the operator by means of a warning signal output by the operating unit.

The measuring device is preferably configured in such a way that it determines the layer thickness at intervals, particularly with regard to the distance between the at least two additional sensors in front of the screed or with regard to a multiple thereof. The measured values of the respective sensors, in front of and behind the screed, can thereby always be conducted to the evaluation unit for the calculation of the layer thickness when the road paver has driven through the stipulated interval. It is simultaneously optionally possible to register additional measured values, offset each time by a small path distance, that likewise can be used for the thickness calculation. The more simultaneous measurement series are recorded, the more continuous the thickness determination will be.

In a further embodiment of the invention, the height of the measuring device relative to a plane can be adjusted. This makes it possible to arrange the sensors arranged on the measuring device at different heights above the plane depending on their measuring sensitivity.

To calculate the layer thickness of a newly laid road pavement, the following devices and/or methods can also be used.

One of these is a carriage that is movably mounted on the screed and that extends from the screed, through the newly applied mixture and to the plane. A displacement of the carriage relative to the screed is registered by means of a translational sensor in order to obtain a height of the screed relative to the carriage. An angle sensor is furthermore arranged on the carriage in order to register a change in the inclination of the carriage relative to the screed. The combination of the angle sensor and the translational sensor can produce a geometric relationship between the rear edge of the carriage and the rear edge of the screed in such a way that the thickness of the laid layer can be calculated. In order for the carriage to be better movable in the mixture, the carriage can additionally be heated.

The layer thickness can also be determined by mounting a heated hook in front of the screed, possibly to the towing machine of the road paver, whereby the heated hook is formed in such a way that the end of the hook is located, both on the plane and underneath the rear edge of the screed, in the layer that has been laid. By means of a sensor mounted on the screed, the end of the hook can be registered underneath the rear edge of the screed in order to determine the layer thickness.

The layer thickness calculation is also possible by means of a tube water level that preferably comprises three measurement elements pulled one behind the other and also fluidly connected to one another. The two first measurement elements are thereby guided on the plane, while the third, last measurement element is pulled on the surface of the newly laid road pavement. The two front measurement elements represent a reference and are used by the two rear measurement elements, meaning the tube water levels, for determining the thickness as soon as the middle tube water level is located at a place at which the first measurement element was located at a previous time. An inclination sensor can be provided for the tube water level so that changes in the inclination are not neglected in the measurement result. In another variant, it is also possible to calculate the change in the inclination on the basis of the registered height differences of the tube water levels without an inclination sensor, and to take them into consideration in the determination of the thickness.

In order to produce, in a simple manner, an inclination reference for determining the layer thickness, it is also possible to provide the towing machine with two frames connected to each other by means of a pivot joint, whereby the front one of these is in contact with the plane in two points and the rear one is in contact with the plane with the entire joint and is in contact with the newly laid layer with the rear point. Each of the two frames has an inclination sensor. The front frame consequently records a reference that is used for determining the thickness as soon as the rear frame is located at the old position of the front frame. As a substitute, the layer thickness can also be registered by means of an infrared sensor that is arranged on the front frame and that registers a height change of the rear frame that has an articulated connection to the front frame.

In another optional execution for determining the layer thickness, a bridge-like arrangement is arranged above the screed in such a way that a first movable arm is towed on the plane by means of angle registration and a second movable arm is towed on the newly laid road layer along the driving direction, likewise by means of angle registration. It is likewise possible for a plurality of towing elements, adjustable in the angle, to be pulled behind the screed, by means of which the layer thickness can be registered relative to a reference located on the plane. It is likewise possible to mount the two angled bridges on the screed on a pivot bearing.

Embodiments of the invention are presented using the drawings. Shown are:

DETAILED DESCRIPTION OF THE INVENTION

Figure 1:
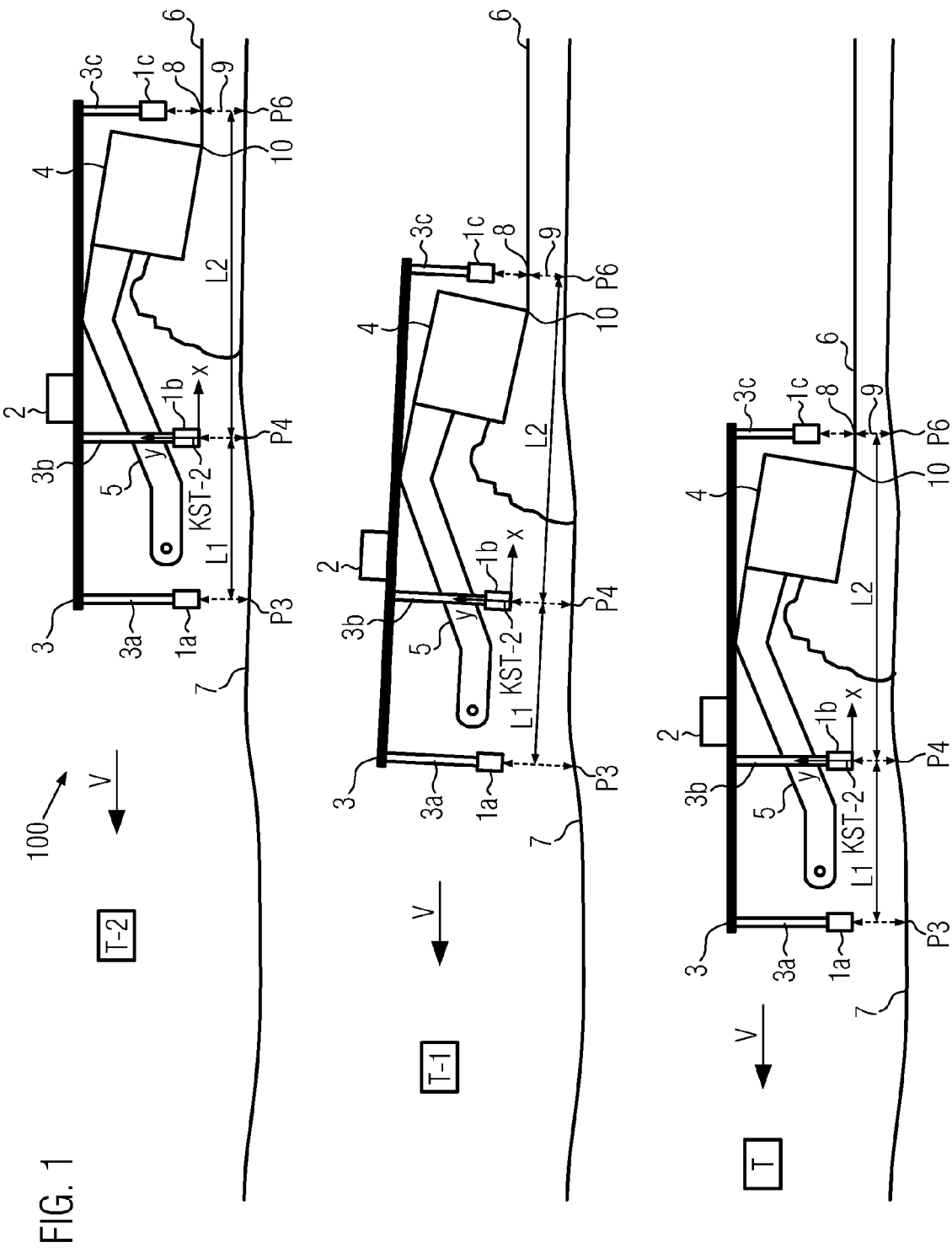
FIG. 1 a measuring device that determines the layer thickness at certain intervals, meaning at different points in time T, T-1 and T-2, and FIG. 2 a road paver with the measuring device according to the invention.
Figure 2:
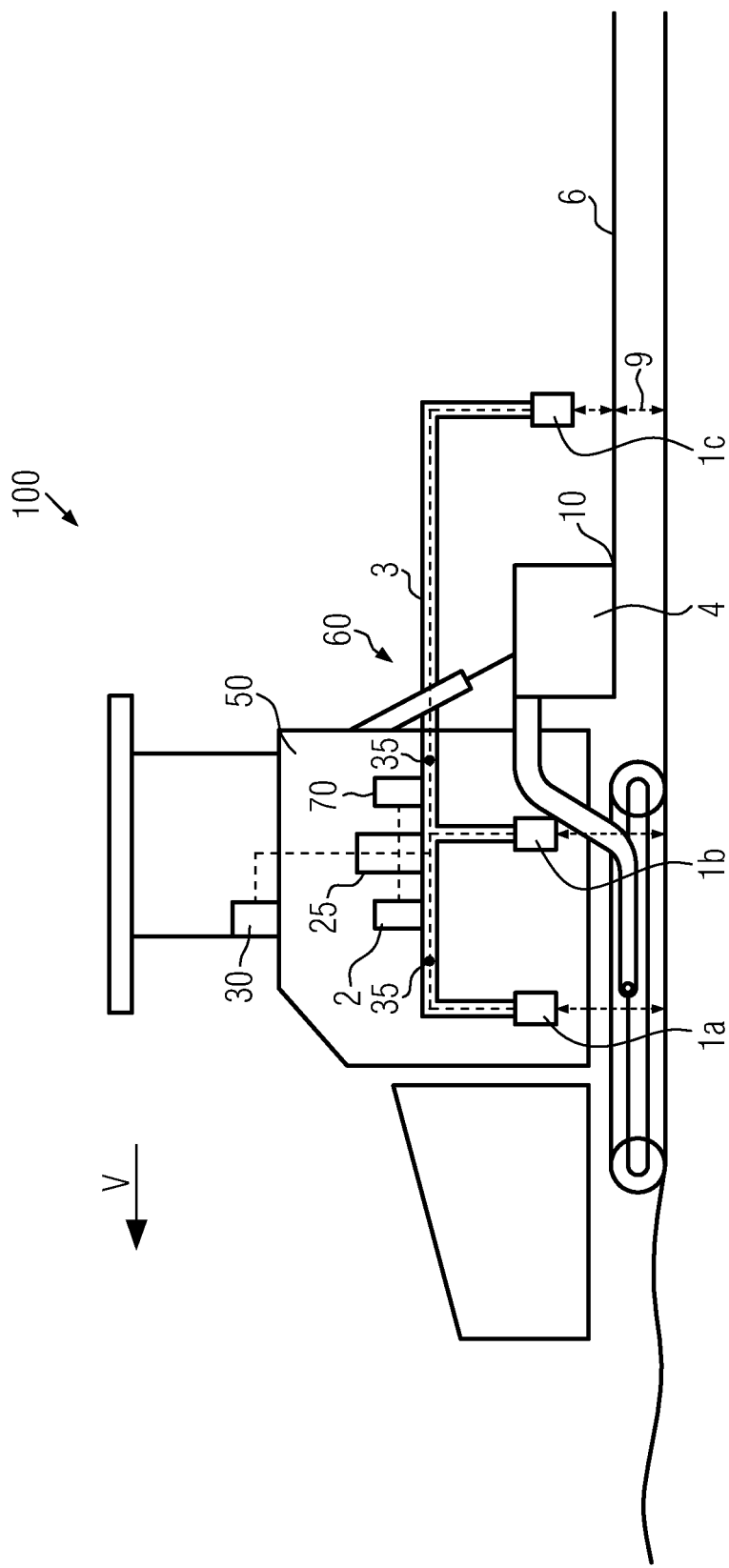

FIG. 1 shows a measuring device 60 that is depicted at different points in time T, T-1 and T-2 along a direction of travel V. The measuring device is arranged rigidly on a road paver 100, particularly on its towing machine 50. The road paver 100 is only suggested in FIG. 1, but is shown in FIG. 2. The road paver 100 moves along the direction of travel V on a subgrade 7 onto which the material for the new road pavement layer is to be laid. As shown by FIG. 1, the subgrade 7 has a wavy surface which causes the towing machine 50, including the measuring device 60 rigidly mounted upon it, to tilt back and forth along the paving section. The newly driven road pavement 6 forms a new driving surface whose layer thickness 9 can be determined by the measuring device 60 during the paving run of the road paver 100.

The measuring device 60 comprises a mounting element 3, which is aligned essentially horizontally with respect to the subgrade 7. The mounting element 3 can be present in the form of a rod or a bar that is mounted, in the direction of travel V, on a left and/or on a right side of the road paver 100. In addition to a rigid mounting to the road paver 100, the mounting element 3 can be mounted to the road paver 100 in such a manner that it can be detached, as well as tipped or slid.

FIG. 1 furthermore shows an inclination sensor 2 that is arranged on the mounting element 3. The inclination sensor 2 can be arranged at different places along the mounting element 3. The mounting element 3 furthermore comprises essentially rod-like holders 3a, 3b, 3c sticking out from it perpendicularly that are directed downwards from the mounting element 3 in the direction of the subgrade 7. Distance sensors 1a, 1b, 1c are held at a height relative to the subgrade 7 or relative to the newly laid road pavement 6 by the holders 3a, 3b, 3c. The distance sensor 1c forms a first sensor that is positioned behind a screed 4. The screed 4 comprises a rear edge 10, through whose positioning a layer thickness 9 of the newly laid road pavement 6 is defined. The first sensor 1c is arranged behind the rear edge 10 in order to measure the layer thickness 9 at a predetermined distance behind the screed. This distance should be formed to be as small as possible in order to guarantee a short response time between the production of the layer and the measurement of the thickness.

The height of the screed 4 can be adjusted by means of a movable tow arm 5, whereby a movement of the tow arm 5 does not bring about a movement of the measuring device 60. Seen in the direction of travel V, to the left of the screed 4, the distance sensors 1a, 1b are spaced apart from one another by a distance L1. The distance between the distance sensor 1b and the first sensor 1c, which, seen in the direction of travel V, is arranged to the right of the screed 4, amounts to a distance L2. The distance L2 is equal to or is an integer multiple of the distance L1.

In the following, FIG. 1 is used as the basis for explaining the measurement at intervals. At the point in time T-2, each of the two sensors 1a, 1b determines a distance to the points P3, P4, which lie on the subgrade 7. At the same time, the first sensor 1c registers a distance to the surface, meaning to the intended place 8, of the newly laid pavement 6. If the measuring device 60 moves together with the towing machine 50 in the direction of travel V, at the point in time T-1, meaning after the distance L1 has been covered, a distance measurement is again carried out by the sensors 1a, 1b, 1c, so that the sensor 1b determines a distance between itself and the point P3, which was registered by the sensor 1a at the point in time T-2. The same also applies to the other sensors, which carry out a distance measurement to a place on the plane 7 or the road pavement 6 after the distance L1 has been covered, where a distance measurement has already been made previously by a length L1. It is consequently possible during the paving run to produce a height difference each time the distance L1 is covered, whereby this height difference can be used as a reference for calculating the layer thickness 9. For example, at the point in time T, the first sensor 1c registers a distance to the stipulated place 8 via the point P4, at which the sensor 1b already measured a distance to the plane 3 at the point in time T-2. The difference between the distance values registered after the coverage of the distance L2 and the inclination change registered by means of the inclination sensor 2 over the distance L2 can then be used for calculating the layer thickness 9. After the point in time T, the layer thickness 9 can already be calculated at the place P3 after the coverage of the distance L1, etc.

In light of FIG. 1, the measurement at intervals can also be explained as follows. FIG. 1 shows the case in which the distance L2 is exactly twice as large as the distance L1. First the point P4 is considered, which is measured by the sensor 1*b* at the point in time T-2 and which depicts the point on the plane at the point in time T, at which the thickness 9 should be determined. For this purpose, the distance between the sensor 1*a* and the point P3 as well as between the sensor 1*b* and the point P4 together with the inclination registered by the inclination sensor 2 are measured at the point in time T-2. It is consequently known where the point P4 is located with respect to the point P3. At the point in time T-1, the paver has driven farther by the distance L1. The point P3 can be defined at the point P2 by means of the two distances between the sensor 1*a* and the point P2 and between the sensor 1*b* and the point P3, as well as the value of the inclination sensor 2. The position of point P4 can now also be calculated based on the point P2. At the point in time T, the paver has again driven farther by the distance L1. Analogously to the previous step, the position of the point P4 can now be expressed on the point P1. The point 8 is also known in reference to the point P1 via the sensor 1*c*, so that the thickness 9 can be calculated by means of the point 8 and the point P4.

FIG. 2 shows a road paver 100 with a towing machine 50, a movable screed 4 and a measuring device 60 that is provided for determining the layer thickness 9. The measuring device 60 shows how the mounting element 3 is mounted on supports 35 on the towing machine 50. The supports 35 can be formed as cushioning units. FIG. 2 also shows an evaluation unit 25 that is arranged on the mounting element 3 of the measuring device 60. The evaluation unit 25 is connected to the inclination sensor 2 and to the distance sensors 1*a*, 1*b*, 1*c* and is configured to determine the layer thickness 9 during the paving run along the direction of travel V. The layer thickness 9 can be conveyed to the operator by an operating unit 30 which is preferably arranged in the drivers cab of the road paver 100 and connected to the evaluation unit 25. The operating unit 30 can, however, also be carried by an operator who walks along next to the paving section and who visually checks the quality of the new laid layer. Finally, FIG. 2 shows a path measurement unit 70 that is mounted on the mounting element 3 and connected to the evaluation unit 25. The path measurement unit 70 is formed to trigger the evaluation unit 25 as soon as the predetermined interval, meaning the distance L1, has been covered by the towing machine 50 in order to calculate the layer thickness 9.

The invention claimed is:

1. Road paver with a towing machine and a movable screed and with a measuring device that is provided for determining a layer thickness of a road pavement that has been newly laid by the screed, wherein the measuring device is formed to determine the layer thickness at an intended location, seen relative to a direction of travel behind a rear edge of the screed, wherein the measuring device is mounted on the road paver so as to determine the thickness of the layer independently of a geometric shape and a movement of the screed and includes at least one inclination sensor that registers the changes in the inclination of the measuring device during a paving run.

2. Road paver according to claim 1, wherein the measuring device is arranged on the towing machine of the road paver.

3. Road paver according to claim 2, wherein the measuring device is detachably mounted to the towing machine.

4. Road paver according to claim 2, wherein the measuring device is mounted to the towing machine by means of a mounting element.

5. Road paver according to claim 4, which comprises a sensor mounting element in which the length of the element is adjustable relative to the direction of travel.

6. Road paver according to claim 2 wherein the measuring device comprises at least one first sensor that is directed at the intended location and configured to measure a distance to the intended location.

7. Road paver according to claim 6, wherein the measuring device comprises at least two additional sensors that are arrayed relative to the first sensor in the direction of travel to measure a distance to a plane.

8. Road paver according to claim 7, wherein the at least two additional sensors are spaced apart from each other by a distance in the direction of travel.

9. Road paver according to claim 8, wherein each of the at least two additional sensors is spaced apart from the first sensor by an integer multiple of the distance.

10. Road paver according to claim 9, wherein the measuring device comprises a path measurement unit.

11. Road paver according to claim 10, wherein the measuring device comprises an evaluation unit.

12. Road paver according to claim 11, wherein the evaluation unit is connected to the distance sensors, the at least one inclination sensor as well as to the path measurement unit to determine the layer thickness at the intended location behind the screed.

13. Road paver according to claim 1, wherein the measuring device is configured to determine the layer thickness at intervals.

14. Road paver according to claim 1, wherein the measuring device can be adjusted in the height relative to a plane.

15. A road paver comprising a towing machine, a moveable screed, at least one measuring device mounted on the road paver for measuring the thickness of a layer of road pavement laid down by the screed at a location behind the rear edge of the screed independently of a geometric shape and a movement of the screed.

16. Road paver with a towing machine, a movable screed and having a measuring device mounted to the towing machine by means of a mounting element, the measuring device being provided for determining a layer thickness of a road pavement that has been newly laid by the screed,
the measuring device being formed to determine the layer thickness at an intended location, seen relative to a direction of travel behind a rear edge of the screed, and being mounted on the road paver so as to determine the thickness of the layer independently of a geometric shape and a movement of the screed and the measuring device includes at least one inclination sensor that registers the changes in the inclination of the measuring device during a paving run and
wherein the measuring device comprises an evaluation unit and a path measurement unit and includes at least one first sensor that is directed at the intended location and configured to measure a distance to the intended location and at least two additional sensors that are arrayed relative to the first sensor in the direction of travel to measure a distance to a plane and spaced apart from each other by a distance in the direction of travel and each of the at least two additional sensors is spaced apart from the first sensor by an integer multiple of the distance.

* * * * *